United States Patent
Eckstein

[11] Patent Number: 5,872,936
[45] Date of Patent: Feb. 16, 1999

[54] APPARATUS FOR AND METHOD OF ARBITRATING BUS CONFLICTS

[75] Inventor: Bruce Eckstein, Cupertino, Calif.

[73] Assignee: Apple Computer, Inc., Cupertino, Calif.

[21] Appl. No.: 646,076

[22] Filed: May 7, 1996

Related U.S. Application Data

[63] Continuation of Ser. No. 436,968, May 8, 1995, abandoned.

[51] Int. Cl.$^6$ .................................................. G06F 13/36
[52] U.S. Cl. .......................... 395/287; 345/520; 348/94
[58] Field of Search .................................. 395/287, 520, 395/521, 293, 299; 345/520, 521; 348/94

[56] References Cited

U.S. PATENT DOCUMENTS

| | | |
|---|---|---|
| Re. 34,810 | 12/1994 | Lemaine et al. . |
| 4,701,796 | 10/1987 | Kamiya . |
| 4,723,164 | 2/1988 | Nienaber . |
| 4,899,218 | 2/1990 | Waldecker et al. . |
| 4,991,112 | 2/1991 | Callemyn ................................. 395/520 |
| 5,001,652 | 3/1991 | Thompson ............................... 395/520 |
| 5,197,119 | 3/1993 | Ohuchi ..................................... 395/520 |
| 5,323,309 | 6/1994 | Taylor et al. . |
| 5,392,396 | 2/1995 | MacInnis . |
| 5,467,295 | 11/1995 | Young et al. . |

*Primary Examiner*—Meng-Ai T. An
*Assistant Examiner*—X. Chung-Trans
*Attorney, Agent, or Firm*—Burns, Doane, Swecker & Mathis, L.L.P.

[57] ABSTRACT

An apparatus for and method of arbitrating bus conflicts is disclosed. The system can use information about the status of a data stream to switch between more or less restrictive prioritization schemes. In one particular embodiment, the arbitration system can also be programmed by causing it to store information on overall system requirements for data which the arbitration system can then use to set a current prioritization scheme.

26 Claims, 8 Drawing Sheets

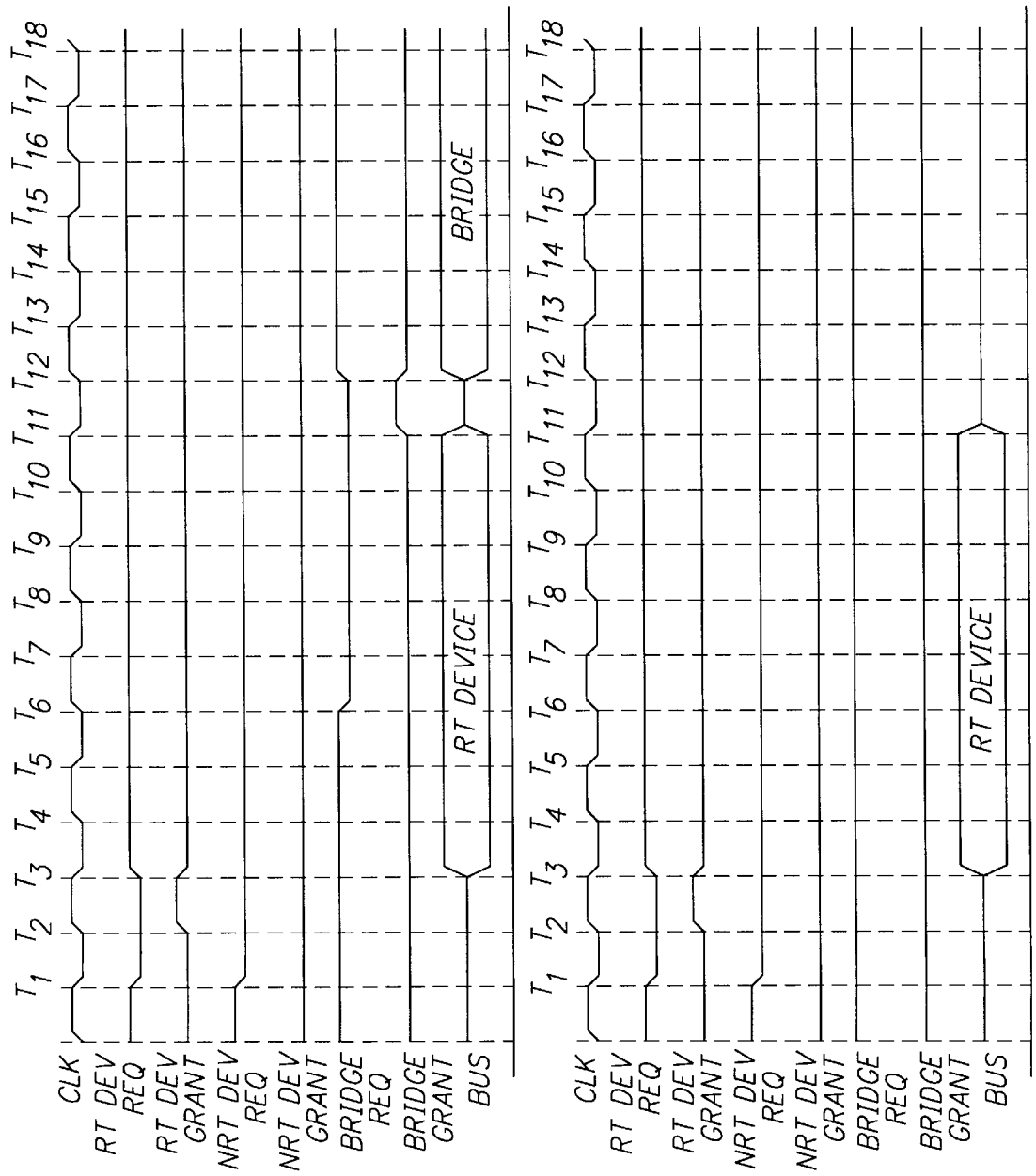

APPARATUS FOR AND METHOD OF ARBITRATING BUS CONFLICTS

This application is a continuation-in-part application of application Ser. No. 08/436,968, filed May 8, 1995, now abandoned

FIELD OF THE INVENTION

The present invention relates to bus arbitration in computer systems, and more particularly, to a bus arbitration system in which an arbiter is responsive to a signal indicative of the status of information for transfer by a device on the bus to set bus access priority, and to a bus arbitration system in which a bus arbiter can be programmed or configured by the system processor to change its mode of prioritization.

BACKGROUND OF THE DISCLOSURE

In many computer systems, components are connected by a shared bus. In such an architecture, only one unit at a time can exert control over the shared bus. Contention among the units which request use of the bus at the same time must be resolved in some manner, i.e., arbitrated.

The most basic arbitration scheme is the so-called "first in first out" arbitration scheme. In this scheme, requests to use the bus are granted strictly in the order in which they arise. This scheme has the advantage of simplicity, but the disadvantage that the relative importance of a device is not taken into account in determining when to grant its request for access to the bus. Thus, devices urgently requiring access to the bus may have to wait while other lower priority devices complete their use of the bus.

A commonly used prior art method for bus arbitration overcomes the above disadvantage by using a central arbiter communicating with all of the devices requesting use of the bus. The central arbiter determines which device has the highest bus use priority taking into account relative importance of the device and how long the device has been waiting to use the bus.

Another known arbitration system can be referred to as "daisy chaining". In this method, a signal indicating that the bus is available for use is transmitted from device to device in priority order. Any device requiring access to the bus captures the signal during its turn and uses the bus. Another prior art scheme offers a rotating priority method wherein bus access is offered to each device in a strict rotation.

The demands for efficient arbitration of bus contentions are especially pronounced in a computer system which processes real time data streams, such as video data streams, and audio data streams, animation data streams. It is crucial for real time data streams to be transferred without interruption since an interruption may be visually or audibly noticeable to an observer. Furthermore, if an arbiter is unable to provide a relatively rapid grant to a device transferring real time data streams, large buffers within the device may be required to store the real time data before it can be transferred. For example, if the arbiter were not assuredly able to provide a relatively swift grant to a video input DMA controller, the video input DMA controller would need large data FIFO buffers to detain high bandwidth video input until it can be transferred via the bus. Large FIFO buffers add significant size and thus cost to the design of a video input controller.

As a result, processing real time data streams requires special control of the system bus beyond what is necessary for non-real time data streams. In some prior art systems, this need is addressed by permitting a real time data stream controller such as a video input DMA controller to retain exclusive use of the bus once granted control until the entire video data stream has been transferred.

SUMMARY OF THE INVENTION

It is an object of the present invention to overcome the deficiencies of the prior art by providing a method of and apparatus for prioritizing the allocation of a bus to a plurality of devices during a real-time data transfer. The invention takes advantage of intervals during an overall data transfer operation when in fact no active data is being transferred. In a system according to the invention, an arbiter is given information about such intervals and can permit other devices to use the bus during the intervals. In another aspect of the invention, the arbiter receives arbitration information from the system which the arbiter uses to determine a prioritization mode.

In one aspect, the present invention is an arbitration system in which a bus arbiter determines a priority of granting control of the bus based at least in part on a data status signal from one of the devices connected to the bus. In one embodiment, the device transfers real time data in the form of a video signal, and the data status signal indicates whether the concurrent video signal is a synchronization signal. The arbiter can additionally or alternatively determine priority in accordance with programming data supplied by the system processor. The programming data may indicate a concurrent system requirement such as for odd field or even field data. The data status signal may additionally or alternatively indicate which of even field data and odd field data constitutes the concurrent video signal.

In yet another aspect, the invention is a method of arbitrating bus conflicts between a first device and a second device in a computer system, the method comprising the step of determining a priority of granting control of the bus to one of the first device and the second device based at least in part on a data status signal from the first device. Priority may additionally or alternatively be determined in accordance with programming data supplied by the system processor.

BRIEF DESCRIPTION OF THE DRAWINGS

These and other features and advantages of the invention will be readily apparent to one of ordinary skill in the art from the following written description, used in conjunction with the drawings, in which:

FIG. 9–12 are timing diagrams showing various arbitration scenarios.

DETAILED DESCRIPTION

Figure 1:
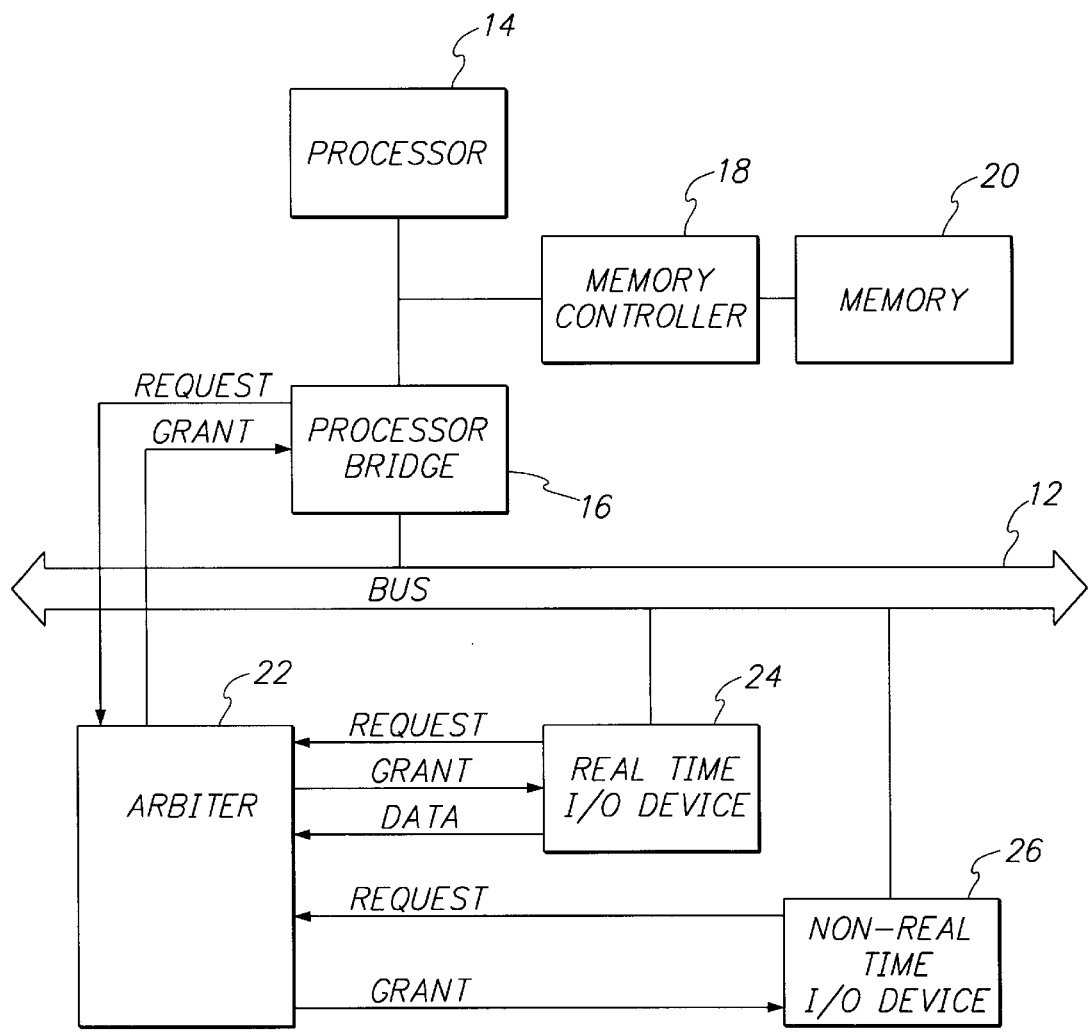
FIG. 1 is a functional block diagram of a system incorporating one embodiment of the present invention.

FIG. 1 is a functional block diagram of a computer system incorporating one embodiment of the present invention. The system in FIG. 1 includes a system bus 12. In the presently preferred embodiment, this bus is a Peripheral Component Interconnect (PCI) local bus. Details concerning PCI local buses are provided in "PCI Local Bus Specification," Review Draft Revision 2.1, published Oct. 21, 1994, by PCI Special Interest Group. It will be readily appreciated by one skilled in the art, however, that the present invention is not limited to use in systems having a PCI local bus, but rather can be used with any high performance bus.

As illustrated in FIG. 1, the system bus 12 has three nodes. One node is I/O device 24 which in this example is a node over which real time data is transferred. Another node is I/O device 26 which is a node which will transfer exclusively non-real time data. A third node is the processor bridge 16, through which system components such as a processor 14, a memory controller 18, and a memory 20 access the bus 12. It should be noted, however, that it is possible to connect a processor directly to the bus, in which case references to processor bridge as used herein should be understood as including the case of connection to the processor directly.

These devices are all bus master devices, i.e., devices which request control of the system bus to write or read data to or from another (slave) device via the system bus 12. It will be appreciated by one skilled in the art that the present invention is not limited to a system which contains only three nodes, but instead has application to systems having any one of a number of alternate configurations.

The processor bridge 16 allows the processor 14 to access the devices connected to the PCI bus. One example of this type of access is when the processor 14 performs read or write operations to registers that are contained in either the real time I/O device 24 or the non-real time I/O device 26. The processor bridge 16 also allows either of the I/O devices 24 and 26 to access the system memory 20 via the memory controller 18 in a known manner.

The system of FIG. 1 also includes an arbiter 22. The arbiter 22 is connected to the real time I/O device 24, the non-real time I/O device 26, and the processor bridge 16 by respective pairs of lines, each pair containing a "REQUEST" line and a "GRANT" line. These are the lines over which the I/O devices and bridge send requests to use the system bus 12 to the arbiter 22, and over which the arbiter 22 sends a signal granting the request if the arbitration scheme used by the arbiter 22 permits it.

In the embodiment shown, the arbiter 22 also receives at least one additional signal ("DATA") from the real time I/O device 24. This signal is indicative of a status of the data stream being transferred through the real time node 24. For example, if the real time node 24 is transferring video data, the DATA signal may be a signal indicating that the current portion of the video data is a vertical sync signal, or a horizontal sync signal, or whether an even or odd field of a video frame is being transferred. Although the DATA line shown here is a single line, it will be understood that the DATA signal may include additional lines.

It is one feature of the present invention that the arbiter 22 can use this information in its prioritization of access requests. In other words, the arbiter 22 is able to employ one prioritization scheme during one portion of the real time data stream, and another prioritization scheme during another portion of the real time data stream.

Figure 2A:
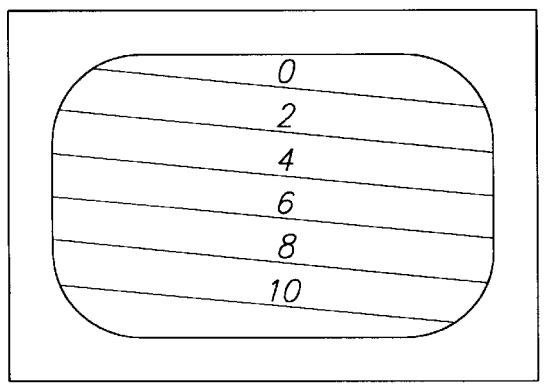
FIGS. 2(a) and 2(b) illustrate a video scanning pattern.
Figure 2B:
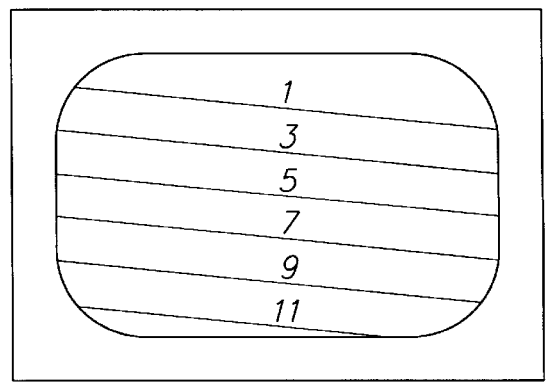

For example, suppose the data signal indicates the existence of a vertical sync pulse. The derivation of a digital video sync signal from a video signal is conventional. During a sync pulse, horizontal or vertical, real time data demands on system resources are reduced since no active video data is being transferred. The reason for this may be understood by referring to FIGS. 2(a) and 2(b). Video scanning starts at the upper left hand corner of an image and proceeds to the right with a slightly downward motion as illustrated. When the scan reaches the right side of the image it rapidly returns or retraces to a position below its starting point of the previous line and again proceeds to the right in a slightly downward motion. The time it takes the scan beam to retrace back to the left side is called horizontal sync (HS) time.

A succession of active scans and rapid retraces continues until a point near the bottom of the picture is reached, at which time the beam rapidly moves upward to a mid-point at the top of the picture. When the scan reaches the bottom of a picture, it must return to the top of the picture before the next scanning line can begin. The time it takes for the scan beam to go from the bottom of the picture to the top of the picture is called vertical sync (VS) time.

The downward scan and retrace motions are then repeated, with the second set of scan lines falling between the first set of scan lines. The first set of scan lines is called an even scan line field and the second set of scan lines is called an odd scan line field.

As a result, a video data stream is comprised of a plurality of alternating even scan lines and horizontal sync periods followed by a vertical sync period which in turn is followed by a plurality of alternating odd field scan lines and horizontal sync periods followed by a last vertical sync period. During the vertical sync and horizontal sync periods, the scan line merely returns to a new starting position so no active video data is generated during these periods.

Figure 3:
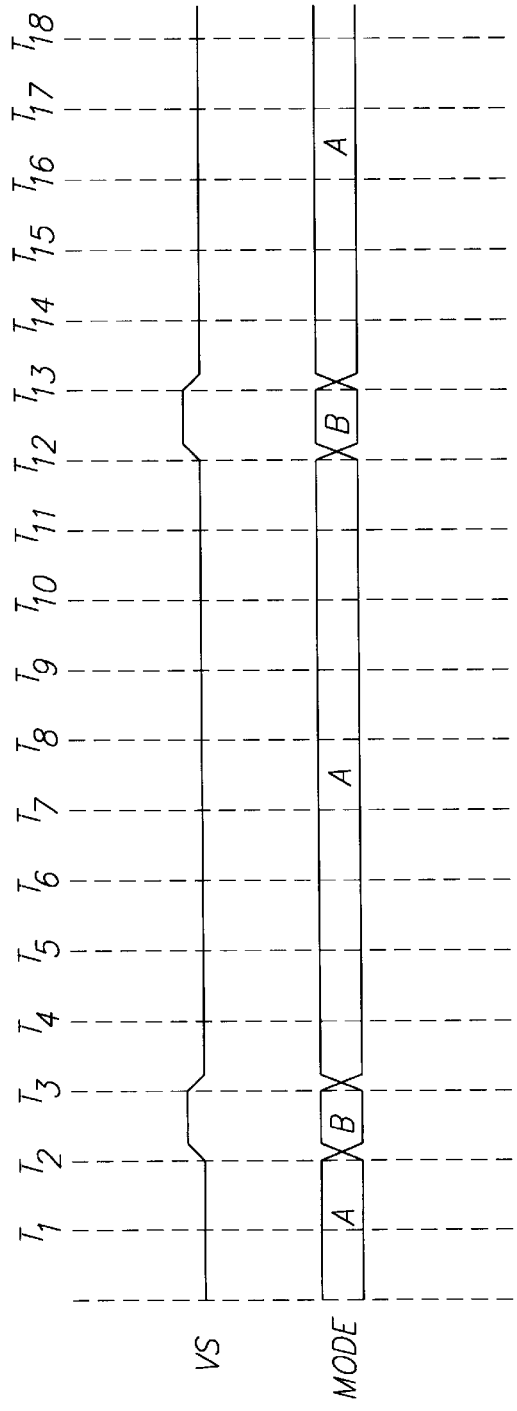
FIG. 3 is a timing diagram showing how a prioritization mode might be set in accordance with the presence or absence of a vertical sync signal.

It is therefore possible to use a prioritization scheme during such periods in which non-real-time data can have a higher priority. This is depicted in FIG. 3, in which the arbitration scheme or mode switches between a mode A during active video (non-sync) time and a mode B where the vertical sync pulse is present (no active video).

In mode A the non-real-time data is given less or even no priority. In mode B the non-real-time data is given a higher priority than it has in mode A. In the presently preferred embodiment, in mode A, access requests are prioritized with requests from the real time node being given the highest priority, requests from the processor bridge being given the next priority, and requests from the non-real-time node being given no priority at all so that the non-real-time node's access to the system bus is effectively blocked. In mode B, access requests are prioritized with requests from the real time node being given the highest priority, requests from the processor bridge being given the next priority, and requests from the non-real-time node being the next priority. Thus, the difference between mode A and mode B is that in mode A the non-real-time device has no opportunity for access to the system bus, while in mode B the non-real-time device is given an opportunity for access to the bus.

In the above scheme, the real time I/O device is always given first priority. In the example of a video I/O device, for example, this is because video input controller may have to use the bus during vertical sync time as well as during active video time for tasks such as reporting the status of the previous video field and setting up the next video field. These tasks nevertheless must be completed before the active data for the next video field starts being transferred. Thus, "real time" demands cannot be assumed to be completely absent during the sync portion of the signal, but they can be assumed to be reduced and less critical.

It should also be noted that the DATA signal is derived from the highest priority device. Since servicing this device is paramount, it is the status of data to be transferred by this device which will in general determine whether other devices should be given an opportunity to access the bus.

In general, once a device has won an arbitration, it is permitted to maintain its control of the system bus until it has completed the data transfer operation for which it requested access. Thus, it is possible in mode B that a non-real-time I/O device has control of the system bus when the real time I/O device requests access. In such circumstances, the real time I/O device would have to wait. The possible adverse effects of this conflict can be mitigated, however, by imposing a requirement that the processor bridge accept only data transfers having a length less than or equal to a certain set number of data phases. This limit may be, say, eight data phases, which would be one cache line on the processor side (256 K cache with a 32 byte size). At this limit, the processor bridge disconnects, and the non-real-time node must re-arbitrate for the bus if it needs to, thus giving the real time device a chance to assert its higher priority. While theoretically eight data phases can take infinitely long to complete if wait states are inserted, as a practical matter there are recommended guidelines for data latency and most if not all devices will not arbitrate for the bus until they can source or sink all of the data for a given transfer. Similar considerations apply to non-real-time data transfers overlapping the transition from mode B to mode A.

As suggested above, there are other intervals where no active data is being transferred, such as the horizontal sync period in a video signal, where non-real-time devices might be provided an opportunity to arbitrate for access to the bus. There are also intervals where active data is being transferred but is not needed by the system, and so where non-real-time devices might be provided an opportunity to arbitrate for access to the bus. For example, for video, there are operations (such as display of a reduced-size image) which may require only one of the odd or even data fields from a video data stream. The other data field does not have to be transferred in such circumstances. As a result, there are intervals of "off-field transfer" when the real time I/O device's need for the bus is reduced.

Figure 4:
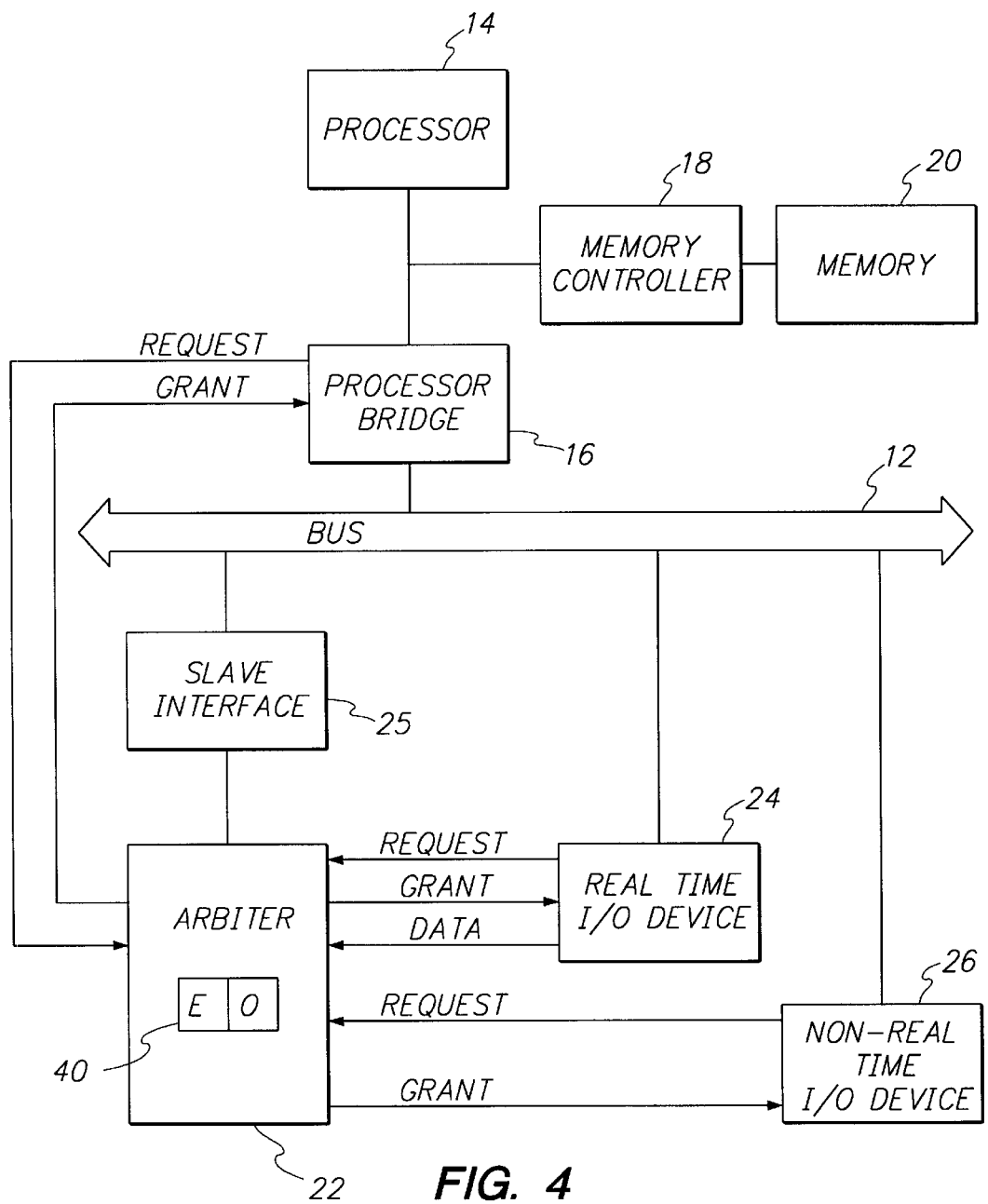
FIG. 4 is a functional block diagram of a system incorporating a second embodiment of the present invention.

Since the system's demand for one, both, or neither of the data fields is conditional, it is advantageous to provide an arbiter which can alter its mode of operation in response to information about system demand. In effect, this system demand information programs or configures the arbiter to alter the arbiter's response to the data status signal. In particular, and using the example from above, the arbiter can revert to mode B operation when off-field data is being transferred, thus permitting the non-real-time I/O device access to the bus which it otherwise would not have. Such a system is shown in FIG. 4. In FIG. 4, the arbiter 22 is connected to the system bus 12 through a slave interface 25, thus permitting the processor to write programming information to storage in the form of a control register 40 within the arbiter 22. Note that the arbiter 22 of FIG. 1 is not necessarily connected to the bus 12 and can be anywhere in the system.

Continuing with the example of video as a real time data stream, in a presently preferred embodiment, the programming information indicative of system requirements is a signal which sets single bit values ("E" and "O") to be stored in the control register 40. The value of "E" is indicative of system requirements for the even video field while the value of "O" is indicative of system requirements for the odd video field. The values assigned to each condition are arbitrary, but one scheme is shown in the following table:

| E | O | REQUIREMENT |
|---|---|---|
| 0 | 0 | BOTH |
| 0 | 1 | EVEN ONLY |
| 1 | 0 | ODD ONLY |
| 1 | 1 | NEITHER |

Figure 5:
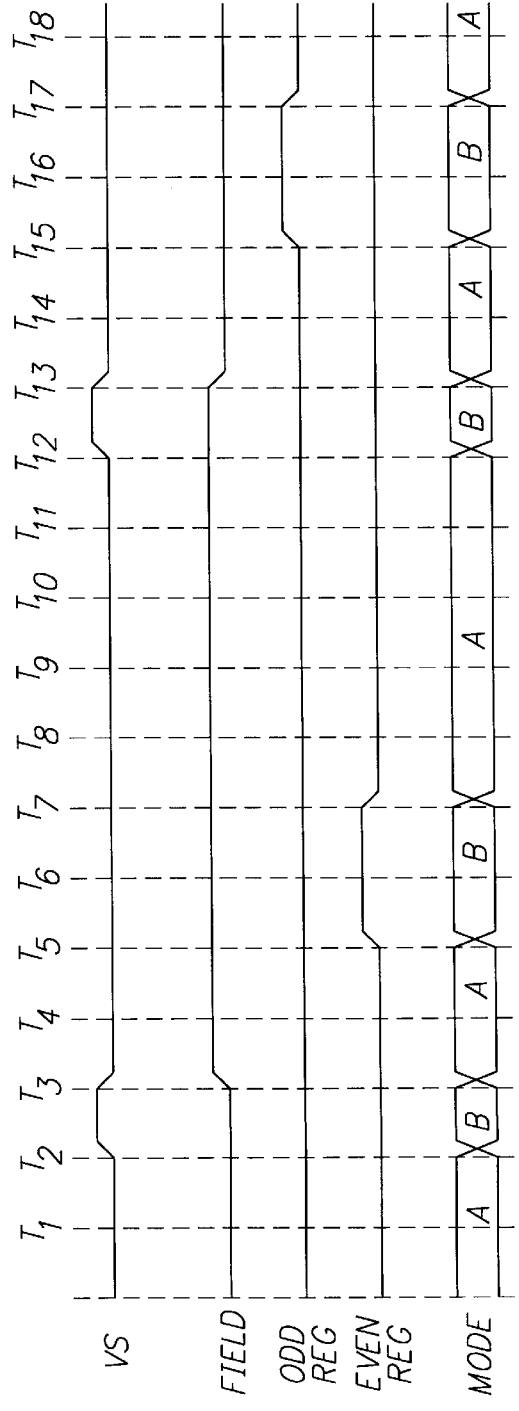
FIG. 5 is a timing diagram showing how a prioritization mode might be set in response to data status signals.

Once the arbiter is programmed with this information, it can switch to, for example, the B mode when an off-field is being transferred. This is shown in FIG. 5, which shows a case where the system requirements change during transmission of a field. This case is presented purely for the sake of illustrating the principles of operation of the invention since it will be readily understood by one of ordinary skill in the art that system configuration will normally be relatively static in use. That is, normally the contents of the register 40 will remain set for time periods on the order of minutes or even longer, and one would in practice very rarely if ever observe a case where those contents would change during a vertical sync.

In FIG. 5, a high "FIELD" signal means that the even field is currently being transferred, and a low "FIELD" signal means an odd field is being transferred. As can be seen, the arbiter 22 determines a mode of operation based on the status of the data stream in accordance with the programming data stored in its control registers.

Figure 6:
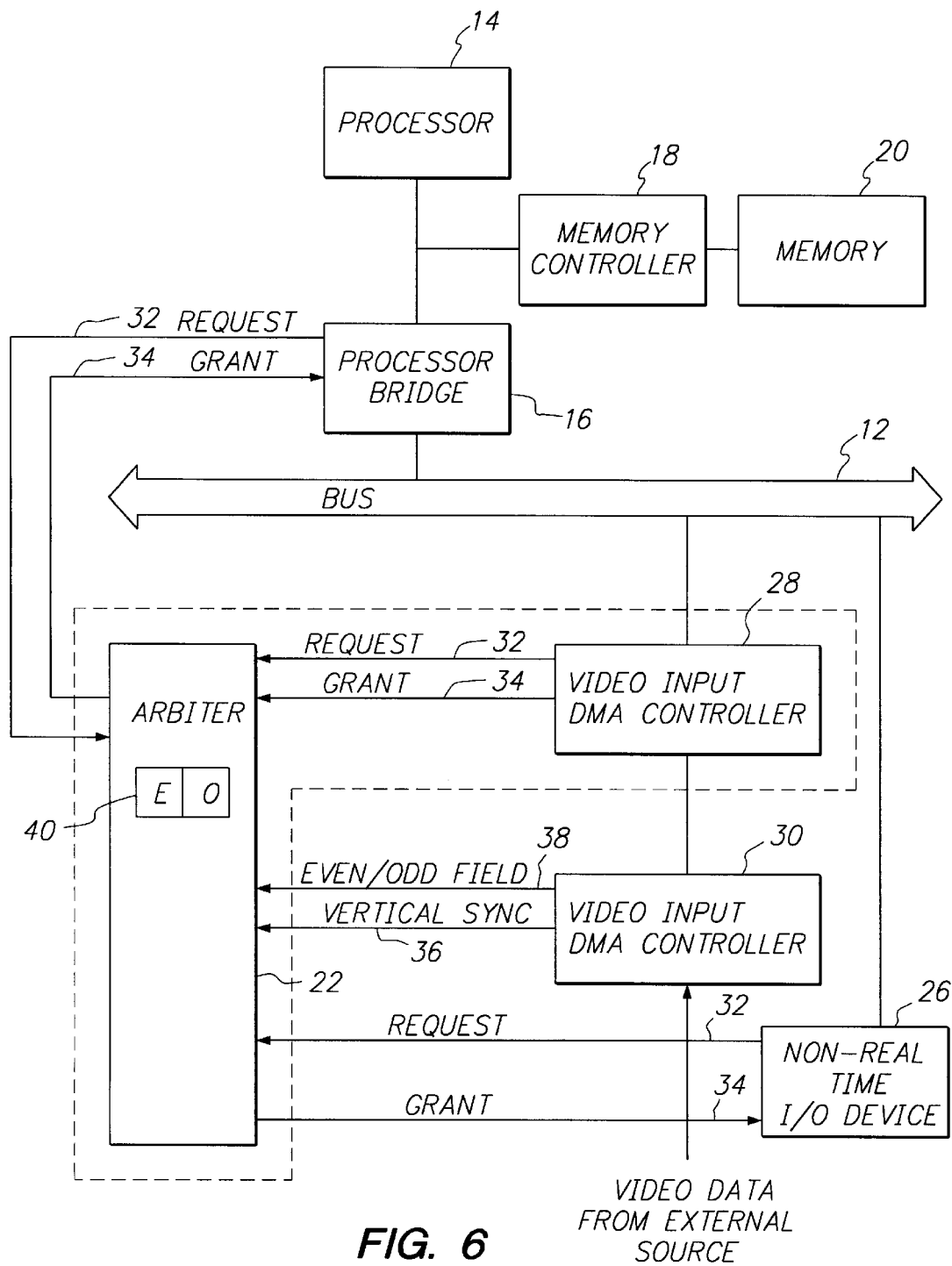
FIG. 6 is a functional block diagram of a system incorporating a third embodiment of the present invention.

Another example of a system according to the present invention is illustrated in FIG. 6. The system of FIG. 6 again uses video data as an example of real time data, but it will still be understood by one having ordinary skill in the art that other types of real time data can be handled in a similar fashion.

FIG. 6 illustrates several bus master devices including a processor bridge 16, a video input DMA controller 28 and a non-real time I/O device 26 which are connected to the bus 12. Each bus master device is also connected to a programmable arbiter 22 by a request line 32 and a grant line 34. Each bus master device can request control of the bus by asserting the request line. In tarn, the arbiter 22 can grant control of the bus 12 by asserting the grant line of a requesting bus master device. The arbiter 22, which preferably may be made up of a suitable arrangement of gate and logic circuits in a manner which will be apparent to one having ordinary skill in the art, contains a control register 40 the contents of which control the arbiter operation.

In the implementation illustrated in FIG. 6, the arbiter is shown as being part of the video input DMA controller device 28. This allows the processor 14 to utilize the PCI slave portion of the video input DMA controller 28 to gain access to the control register 40 present in the arbiter 22. A DMA controller is more completely described in U.S. patent application Ser. Nos. 08/340,248 and 08/340,249, both of which are incorporated herein by reference.

In the embodiment illustrated, the arbiter assigns the video input DMA controller a higher priority than the other bus master devices, since the video input DMA controller handles real-time video signals. However, as noted above, even during a video data stream transfer there are periods of time in which there is no active video data to be transferred.

According to the present invention, the arbiter 22 can be reprogrammed to change the arbitration scheme during the transfer of a real-time data stream.

Figure 7:
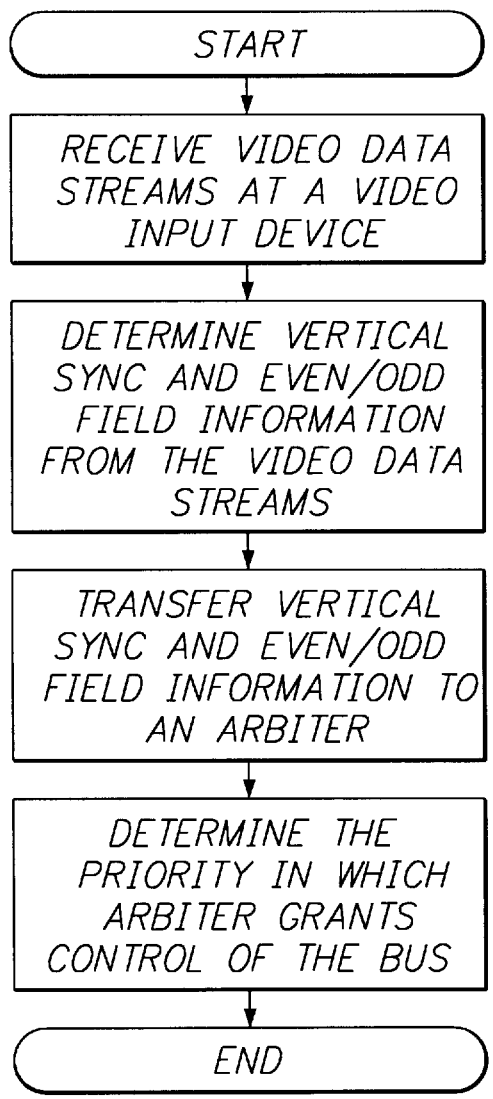
FIG. 7 is a flowchart illustrating instruction flow for a system according to one embodiment of the present invention.

Specifically, the video data streams are inputted into a video input device 30 from an external device. As shown in FIG. 7, the video input device 30 detects a plurality of video related signals from the video data stream, i.e., vertical sync, horizontal sync, and even/odd field, in a known manner. The video input device 30 then transfers the video related signals to the arbiter 22. In one embodiment of the present invention, the video input device 30 transfers the vertical sync and even/odd field information to the arbiter 22. In addition, the video input device 30 passes the video data streams to the video input DMA controller 28.

The arbiter 22 uses the two video timing signals and the contents of the control register 40 to determine the priority of the bus master devices during the transfer of video data streams. The arbiter control register 40 is a two bit register with one bit, an E-bit, controlling the response of the arbiter 22 during an "even" field portion of the video data stream and the other bit, an O-bit, controlling the response of the arbiter 22 during the "odd" field portion of the video data stream. The data stored in the arbiter control register 40 is supplied by the system processor, and indicate to the arbiter 22 whether the overall system needs either, both, or neither of the even or odd fields of the current frame.

The arbiter 22 thus has data from the video input device 30 indicating when the vertical sync occurs and if an even or odd field is being input. The arbiter 22 also has data indicating whether one or both of the even and odd field is superfluous. The arbiter 22 can use this data to identify intervals during real time video transfer when the video input DMA controller has a reduced need to use the bus 12 and to permit other devices to use the bus 12 during such intervals.

Figure 8:
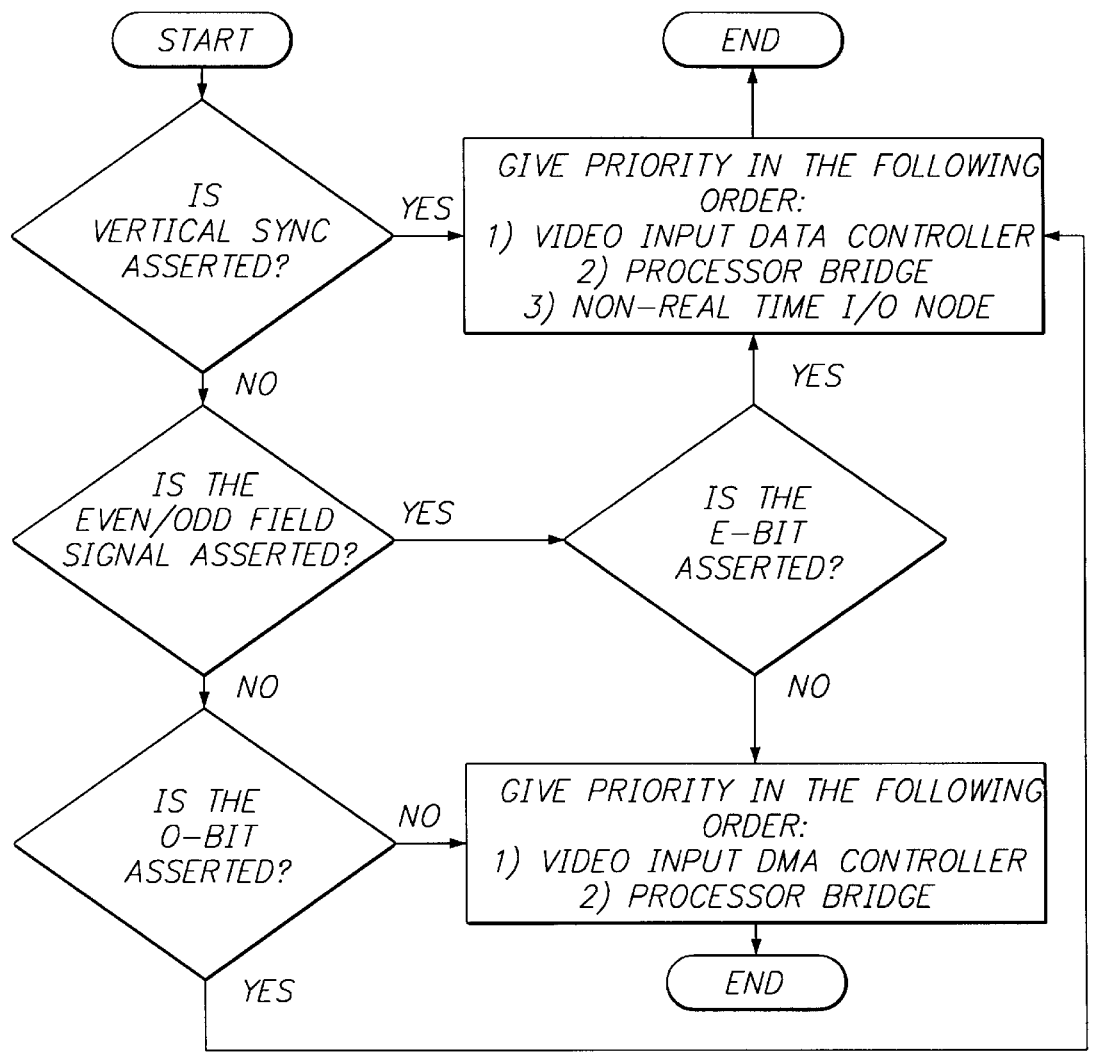
FIG. 8 is a flowchart illustrating instruction flow for a programmable arbiter according to one embodiment of the present invention.

A flowchart for arbiter operation is shown in FIG. 8. If the vertical sync signal is being asserted, i.e. the video data stream has reached a vertical sync period, the arbiter gives the highest priority for access to the bus to the video input DMA controller 28 followed by the processor bridge 16 and then the non-real time device 26.

If the vertical sync signal is deasserted and the even/odd field signal is asserted, i.e., the video signal is in an even field period, the arbiter checks the status of the E-bit. If the E-bit is set to zero, meaning that the system intends to use the even field of the video signal, the arbiter 22 gives the highest priority to the video input DMA controller followed by the processor bridge 16 and does not permit access by the non-real time node. If the E-bit is set to 1, meaning the system does not intend to use the even field portion of the video data, the arbiter gives the highest priority to the video input DMA controller followed by the processor bridge and then the non-real time I/O node.

If the vertical sync signal is deasserted and the even/odd field signal is deasserted, i.e., the video signal is in an odd field period, the arbiter checks the status of the O-bit. If the O-bit is set to zero, meaning that the system intends to use the odd field, the arbiter gives the highest priority to the video input DMA controller followed by the processor through the bridge 16. In addition, the arbiter does not permit access to the non-real time node. As above, the premise is that video data is critical, so that only an interruption originating from the processor 14 will be tolerated. Interruptions originating from a presumptively less critical non-real-time device are not permitted. If the O-bit is set to 1, the arbiter gives the highest priority to the video input DMA controller followed by the processor bridge and then the non-real time I/O node.

FIGS. 9, 10, 11, and 12 are timing diagrams showing operation of the arbitration system as described above. FIG. 9 shows operation of the system in mode A or mode B. The upper trace is the system clock. In the figure, the assumption has been made that data phases correspond to clock pulses, which is true in a well-behaved system. Times T1–T18 are designated in the top row. It is important to note, however, that these times do not correspond to the times in the preceding figures relating to video signals. As is well-known, the duration of the clock pulses is exceedingly small compared to the time of transmission of a video field.

FIG. 9 shows the example of a real-time device and a non-real-time device simultaneously requesting access to the bus. In mode A, the non-real-time device request would simply be ignored; in mode B, the real-time device would win an arbitration. Thus, in either case, the system would respond by providing a real-time device grant signal to the real-time device. This is shown at times T2 to T3. The non-real-time device continues to assert its request, however. In the meantime, however, the bridge requests access to the bus at time T6. Thus, since the real-time device ceases control of the bus after eight data phases at time T1, and does not assert a new request for access, the bridge request is granted, and the bridge assumes control of the bus. Again, this would occur in mode A because the continuing request for the bus from the non-real-time device would be ignored, or in mode B because the bridge would win an arbitration with the non-real-time device for access to the bus.

FIG. 10 shows operation in mode A where the real-time device and the non-real-time device simultaneously request access to the bus at a time T1. Again, the real-time device uses the bus but does not reassert a request for access to the bus before it is finished. Although the non-real-time device has a request for access to the bus pending, however, it is ignored since in mode A the arbiter never permits the non-real-time device access to the bus.

Figures 11, 12:
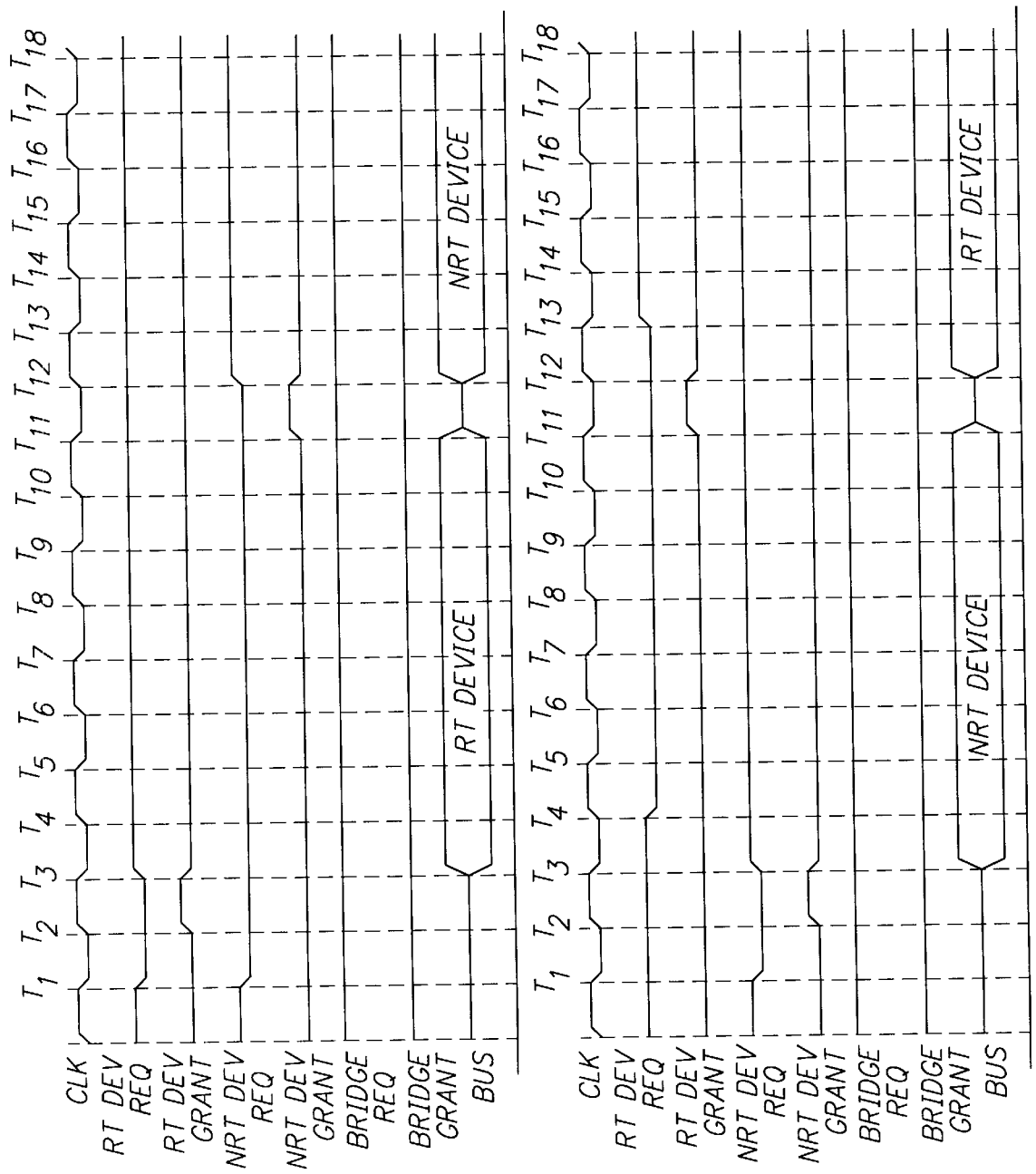

FIG. 11 shows operation in mode B. Operation is essentially the same as in mode A up to time T11. At time T11, however, the arbiter does grant the non-real-time device access to the bus by returning a grant signal. The non-real-time device then asserts control of the bus for up to eight data phases.

FIG. 12 shows operation again in mode B where the non-real-time device requests access to the bus at a time when no other requests are pending. The arbiter therefore awards control of the bus to the non-real-time device. While the non-real-time device has control of the bus, however, the real-time device asserts a request for access at time T4. In this circumstance, however, the real-time device must wait until the non-real-time device has finished using the bus, at which time the real-time device can then be given control of the bus.

These are exemplary. Other situations, of course, arise. For example, it is possible that in mode A, the processor bridge has control of the bus when the real-time device requests access. Again, in such a circumstance, the real-time device must wait until the processor bridge finishes using the bus, at which time the real-time device can be given control of the bus.

It will be appreciated by those of ordinary skill in the art that the present invention can be embodied in other specific forms without departing from the spirit or essential character thereof. The presently disclosed embodiments are therefore considered in all respects to be illustrated but not restrictive.

The scope of the invention is indicated by the appended claims rather than the foregoing description, and all changes which come within the meaning and range of equivalence thereof or intended to be embraced therein.

I claim:

1. A computer system comprising:

a bus:

first device coupled to said bus and transferring video data;

a second device coupled to said bus and transferring non-real time data;

a bus arbiter coupled to said first device and said second device, said bus arbiter determining a priority of granting control of said bus to one of said first device and said second device based at least in part on a data status signal from said first device.

2. A computer system as claimed in claim 1 wherein said data status signal indicates whether the concurrent video signal is a vertical synchronization signal.

3. A computer system as claimed in claim 1 wherein said data status signal indicates whether the concurrent video signal is a horizontal synchronization signal.

4. A computer system as claimed in claim 1 wherein said bus arbiter operates in one of a first mode when said data status signal indicates that the concurrent video signal is not a synchronization signal, wherein bus access requests from said second device are not granted, and a second mode when said data status signal indicates that the concurrent video signal is a synchronization signal wherein bus access requests from said second device may be granted.

5. A computer system as claimed in claim 1 wherein said computer system further includes a processor bridge coupled to said bus and wherein said bus arbiter operates in a first mode when said data status signal indicates that the concurrent video signal is not a synchronization signal in which bus access requests from said first device are given priority over bus access requests from said processor bridge and bus access requests from said second device are not granted, and in a second mode when said data status signal indicates that the concurrent video signal is not a synchronization signal in which bus access requests from said first device are given priority over bus access requests from said processor bridge, which in turn are given priority over bus access requests from said second device.

6. A computer system as claimed in claim 1 further comprising a processor coupled to said bus, wherein said bus arbiter is coupled to said bus and determines a priority of granting control of said bus to one of said first device and said second device additionally in accordance with programming data supplied by said processor.

7. A computer system as claimed in claim 6, wherein said first device transfers real time data.

8. A computer system as claimed in claim 7, wherein said second device transfers non-real time data.

9. A computer system as claimed in claim 8, wherein said real time data is a video signal, and wherein said data status signal indicates which of even field data and odd field data constitutes the concurrent video signal.

10. A computer system as claimed in claim 9 wherein the arbiter includes a memory for storing said programming data.

11. A computer system as claimed in claim 9 wherein said programming data indicates a concurrent system requirement for odd field data.

12. A computer system as claimed in claim 9 wherein said programming data indicates a concurrent system requirement for even field data.

13. A computer system as claimed in claim 12 wherein said programming data indicates a concurrent system requirement for odd field data.

14. A computer system as claimed in claim 13 wherein said bus arbiter operates in one of a first mode when said data status signal indicates that the concurrent video signal is not a synchronization signal and said data status signal indicates that a field being transferred is one for which the programming data indicates a concurrent system requirement, wherein bus access requests from said second device are not granted, and a second mode when said data status signal indicates that the concurrent video signal is a synchronization signal or said data status signal indicates that a field being transferred is one for which the programming data indicates no concurrent system requirement wherein bus access requests from said second device may be granted.

15. A method of arbitrating bus conflicts between a first device and a second device in a computer system, said method comprising the step of determining a priority of granting control of said bus to one of said first device which transfers real time data in the form of a video signal and said second device based at least in part on a data status signal from said first device indicating that the concurrent video signal is a synchronization signal.

16. A method as claimed in claim 15 wherein bus access requests from said second device are not granted when said data status signal indicates that the concurrent video signal is not a synchronization signal and wherein bus access requests from said second device may be granted when said data status signal indicates that the concurrent video signal is a synchronization signal.

17. A method as claimed in claim 15 wherein said computer system further includes a processor bridge coupled to said bus and wherein bus access requests from said first device are given priority over bus access requests from said processor bridge and bus access requests from said second device are not granted when said data status signal indicates that the concurrent video signal is not a synchronization signal and wherein bus access requests from said first device are given priority over bus access requests from said processor bridge, which in turn are given priority over bus access requests from said second device when said data status signal indicates that the concurrent video signal is not a synchronization signal.

18. A method as claimed in claim 15 wherein said data status signal indicates that the concurrent video signal is a vertical synchronization signal.

19. A method as claimed in claim 15 wherein said data status signal indicates that the concurrent video signal is a horizontal synchronization signal.

20. A method as claimed in claim 19 wherein said computer system includes a processor, and wherein determining step further comprises determining a priority of granting control of said bus to one of said first device and said second device additionally in accordance with programming data supplied by said processor.

21. A method as claimed in claim 20 wherein said real time data is a video signal, and wherein said data status signal indicates which of even field data and odd field data constitutes the concurrent video signal.

22. A method as claimed in claim 21 further comprising the step before said determining step of storing said programming data.

23. A method as claimed in claim 21 wherein said programming data indicates a concurrent system requirement for odd field data.

24. A method claimed in claim 21 wherein said programming data indicates a concurrent system requirement for even field data.

25. A method as claimed in claim 24 wherein said programming data indicates a concurrent system requirement for odd field data.

26. A method as claimed in claim 25 wherein bus access requests from said second device are not granted when said data status signal indicates that the concurrent video signal is not a synchronization signal and said data status signal indicates that a field being transferred is one for which the programming data indicates a concurrent system requirement, and wherein bus access requests from said second device may be granted when said data status signal indicates that the concurrent video signal is a synchronization signal or said data status signal indicates that a field being transferred is one for which the programming data indicates no concurrent system requirement.

* * * * *